Aug. 29, 1967  S. A. TATUM  3,338,091
BOOM STRESS MEASUREMENT AND WARNING SYSTEM
Filed May 17, 1965  3 Sheets-Sheet 1

INVENTOR
SAMUEL A. TATUM

BY *Shoemaker and Mattare*

ATTORNEYS

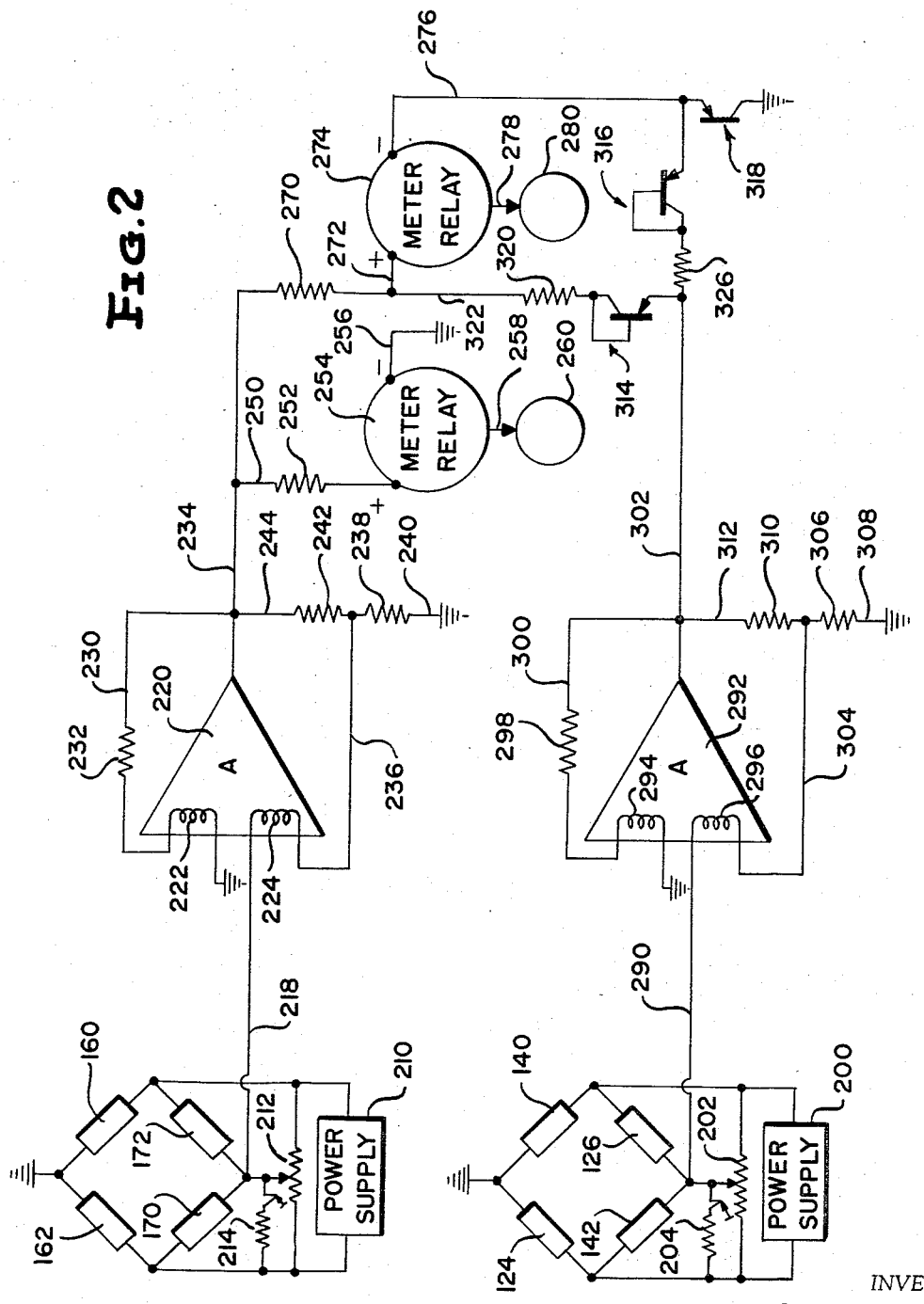

Aug. 29, 1967  S. A. TATUM  3,338,091
BOOM STRESS MEASUREMENT AND WARNING SYSTEM
Filed May 17, 1965  3 Sheets-Sheet 3

INVENTOR
SAMUEL A. TATUM

BY Shoemaker and Mattare
ATTORNEYS

United States Patent Office 3,338,091
Patented Aug. 29, 1967

3,338,091
BOOM STRESS MEASUREMENT AND
WARNING SYSTEM
Samuel A. Tatum, Newport News, Va., assignor to Newport News Shipbuilding and Dry Dock Company, Newport News, Va., a corporation of Virginia
Filed May 17, 1965, Ser. No. 456,093
14 Claims. (Cl. 73—88.5)

ABSTRACT OF THE DISCLOSURE

An elongated boom is pivotally supported at the lower end thereof and has cargo support means at the upper end thereof. Stress measuring means is mounted adjacent the point of maximum stress on the boom and includes strain gauges for measuring bending stresses and compression stresses on the boom. These strain gauges are connected in an electrical network for indicating compression forces and maximum surface stress on the boom.

The present invention relates to new and novel boom stress measurement and warning systems, and more particularly to stress measurement systems adapted to be employed with heavy lift booms as used for handling cargo on ships and the like.

The stress measurement system of the present invention may be employed with various elongated load supporting means, and is especially directed to heavy lift booms of the type as shown for example in U.S. Patent No. 3,110,403, wherein the boom is pivotally and rotatably supported at the heel portion thereof and is adapted to swing between a pair of king posts so that it can effectively be employed for loading and unloading holds disposed both fore and aft of the boom structure.

It has been found in actual practice that heavy lift booms of this type will fail due to over-stressing thereof. This over-stressing may of course be caused by excessive loads applied to the boom, and a particular problem involved with this type of boom arrangement is the over-stressing of the boom while passing between the king posts with the aid of the topping lift winches.

Repeated over-stressing of the boom while passing between the king posts causes fatigue of the material of the boom which accordingly will eventually cause the boom to fail at stresses below the original yield point stress of the material.

It is apparent that it is quite important to continuously monitor the stresses of the boom and to prevent over-stressing and failure thereof both from an economic standpoint in that such booms are quite expensive, and further from a safety standpoint since large loads up to 70 tons or more may be supported by the booms thereby creating a very hazardous situation if the boom should fail when under a heavy load.

The present invention accordingly incorporates an arrangement whereby the stresses of the boom are continuously monitored and indicated and the measurement system may be connected with suitable warning devices so as to prevent over-stressing and failure of the boom.

The stress measurement system incorporates a unique arrangement wherein a plurality of strain gauges are disposed on the boom adjacent the point of maximum stress thereon, and the strain gauges are disposed in a particular relationship so as to provide the desired indication.

First and second pairs of strain gauges are provided in the plane of bending of the boom which extends substantially perpendicular to the heel pin which pivotally supports the boom and further extends through the longitudinal axis of the boom, these first and second pairs of strain gauges being disposed at opposite sides of the boom and being adapted to measure the bending stresses on the boom.

Third and fourth pairs of strain gauges are provided also on generally opposite sides of the boom. The third and fourth pairs of strain gauges are so disposed that the strain gauges of each pair are disposed at right angles to one another to thereby provide the desired indication of compression stresses on the boom. These third and fourth pairs of strain gauges may be positioned at any suitable location on the boom in spaced relationship to the first and second pairs of strain gauges, and in the example illustrated herein are shown as being displaced 90 degrees circumferentially about the boom from the first and second pairs of strain gauges.

With the strain gauge arrangement described above, both the bending and compression stresses can be effectively measured. In addition, a novel electrical network is provided in the measuring system which assures that the signal from the bending stress measuring strain gauges is always positively summed with the signal from the compression stress measuring strain gauges whether the bending signal should happen to be positive or negative, thereby enabling the electrical network to measure maximum surface stress whether caused by compression loads, bending loads or by any combination thereof. It is evident that with this arrangement, the system will provide a warning of any possible over-stressing of the boom by any combination of stresses normally applied thereto either by loads supported at the upper portion of the boom or stresses caused by the topping lift winches which particularly produce compression loads on the boom when swinging the boom between the king posts.

An object of the present invention is to provide a new and novel boom stress measurement and warning system which is especially adapted for use with heavy lift cargo booms and which serves to monitor stresses thereon in a continuous manner.

Another object of the invention is the provision of a boom stress measurement and warning system which provides either a visible or audible warning to operating personnel so as to prevent over-stressing and failure of the boom.

Still another object of the invention is to provide a boom stress measurement and warning system which measures both the compression loads and the bending loads applied to the boom and any combination of such loads.

Yet a further object of the invention is the provision of a boom stress measurement and warning system including a novel electrical measuring network which ensures that maximum surface stress is measured at the point of maximum stress on the boom.

A still further object of the invention is to provide a boom stress measurement and warning system which is quite simple and inexpensive in construction, yet which is at the same time quite efficient and reliable in operation.

Other objects and many attendant advantages of the invention will become more apparent when considered in connection with the specification and accompanying drawings, wherein:

FIG. 2 is a schematic wiring diagram illustrating the electrical connections of the system of the present invention;

Figure 1:
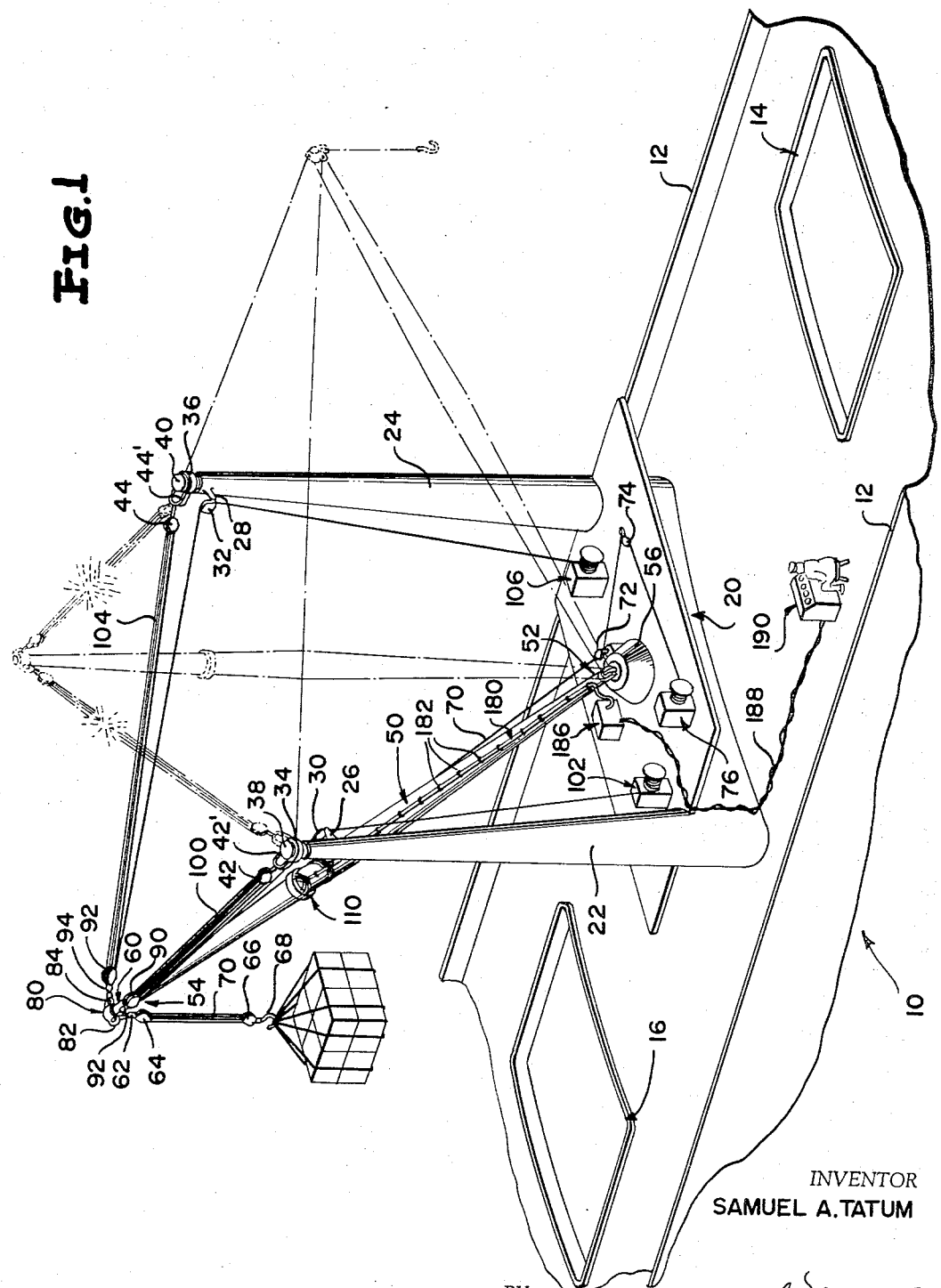
FIG. 1 is a top perspective view of a portion of a ship illustrating the stress measurement system of the present invention incorporated with a heavy lift boom.

Referring now to the drawings wherein like reference characters designate corresponding parts throughout the several views, there is seen in FIG. 1 a portion of a cargo ship indicated generally by reference numeral 10, the upper deck of the ship having the usual bulwarks 12 extending fore and aft at the sides of the deck, a forward hold being indicated generally by reference numeral 14 and an aft hold being indicated generally by reference numeral 16. These holds are indicated schematically, and it will be understood that in the usual construction separate hatch covers will be provided over each of the holds for gaining access thereinto.

A winch house is indicated by references numeral 20 and is disposed between the fore and aft holds and serves to support the heavy lift gear mechanism hereinafter described. It should be understood that the usual ship's gear for loading and discharging cargo would also be mounted on and adjacent to the winch house, but this conventional gear has been eliminated from the drawings for the sake of simplicity. For example, the conventional gear which may be employed along with the heavy lift boom mechanism as shown herein may be of the type as shown in "Marine Cargo Operations" by Charles L. Sauerbier, published by John Wiley & Sons, copyrighted 1956.

The boom and topping lift construction as described hereinafter is substantially identical with that shown in U.S. Patent 3,110,403, and a pair of king posts 22 and 24 extend upwardly from the winch house 20, the king posts being spaced apart athwartships and being of a symmetrical tapered configuration. A pair of laterally inwardly projecting lead block brackets 26 and 28 are provided, these brackets being fixed to the upper end of king posts 22 and 24 respectively. Single topping lift lead blocks 30 and 32 are movably supported from brackets 26 and 28 respectively.

A pair of swivel members 34 and 36 are rotatably supported on upwardly extending journal portions provided at the top of king posts 22 and 24 respectively, the king posts including cap plate members 38 and 40 which extend in overlying relationship to the journal portions for retaining the associated swivel members in operative position as shown. A pair of multiple sheave topping lift king post blocks 42 and 44 are provided, these blocks each being provided with a pair of spaced integral ears 42' and 44' respectively, these ears being pivotally supported by the outwardly projecting end portions of swivel members 34 and 36, whereby the blocks are pivotally supported by the respective swivel members which are in turn rotatably supported at the upper ends of the king posts.

A heavy lift boom 50 is provided, the boom having a lower or heel portion indicated generally by reference numeral 52, and an upper or head portion indicated generally by reference numeral 54. The boom is mounted such that the lower or heel portion thereof is substantially universally mounted as illustrated in the aforementioned U.S. patent, the boom being both pivotally and swivelly mounted on a boom pedestal 56 which is mounted on the winch housing.

A cargo fall support means or sleeve 60 is provided, this sleeve being adapted to rotate about the longitudinal axis of the boom, but being constrained for movement longitudinally of the boom. Suitable means such as a chain or the like 62 is suspended from sleeve 60 and serves to support the upper purchase block 64. A lower purchase block 66 has supported therefrom a conventional cargo hook 68, and a cargo fall cable 70 is reeved through the upper and lower purchase blocks and thence downwardly through purchase lead blocks 72 and 74 to a cargo winch 76.

A topping lift attachment means is indicated generally by reference numeral 80 and is fixedly secured to the upper end of the boom. Attachment 80 has a pair of ears 82 and 84 formed integral therewith. A multiple sheave topping lift boom head block 90 is connected by means of chain 92 to ear 82, while a similar head block 92 is connected by means of a chain 94 to ear 84 of the attachment 80. The chains 92 and 94 serve to swivelly connect the head blocks with the associated ears of attachment 80.

A topping lift cable 100 is reeved through topping lift blocks 42, 90 and 30 and passes downwardly and is connected either directly to a topping winch 102 or through a fair lead and thence to the winch. A topping lift cable 104 is reeved through topping lift blocks 44, 92 and 32 and directly to a second topping winch 106 or through a suitable fair lead and thence to the topping winch. It is apparent that the topping lifts are attached to the tops of the king posts in such a manner as to provide a wide range of operation from forward-and-outboard through an inboard angle to aft-and-outboard.

In operation, either fore or aft of the king posts, the boom is handled just like a conventional split topping rig, and as shown in full lines, the boom is in its aft position for operation over the aft hold indicated by reference numeral 16. As illustrated in phantom lines, the boom can then be swung to a vertical position and thence between the king posts to a position aft of the winch house and over the forward hold 14.

Figure 4:
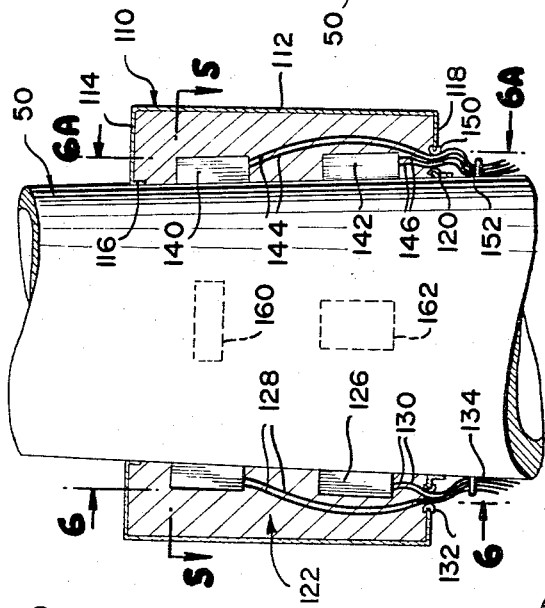
FIG. 4 is an enlarged sectional view taken substantially along line 4—4 of FIG. 3 looking in the direction of the arrows.

The stress measuring means of the present invention comprises a plurality of strain gauges which are mounted within a protective housing indicated generally by reference numeral 110. These strain gauges are mounted at the point of maximum stress on the boom, and accordingly the housing is disposed symmetrically about this point of maximum stress and extends circumferentially around the boom. The construction of protective housing 110 is illustrated in FIG. 4, the housing including a side wall portion 112 joining with an upper wall portion 114 including a downwardly directed flange 116 fitting snugly about the boom 50. A lower wall 118 includes a flange portion 120 which also fits snugly about the boom. The housing can be fixed in operative position as illustrated in any suitable manner such as by welding or the like, and the housing is substantially filled with a body of potting compound indicated by reference numeral 122 and which may comprise a compound identified by the name Eccogel 1265, manufactured by Emersen and Cuming Inc. of Canton, Mass. The strain gauges are held in place on the boom by a suitable adhesive substance, and the potting compound substantially fills the remainder of the housing, and the leads from the strain gauges may be embedded within the potting compound.

The measuring means for measuring bending stresses on the boom includes a first pair of strain gauges 124 and 126 of conventional construction, these strain gauges being of a sealed weldable unit type with approximately 120 ohm gauge resistance and about 1.7 gauge factor.

Leads 128 and 130 are connected with gauges 124 and 126 respectively, the leads extending downwardly through a sealing grommet 132 provided in an opening in the lower wall 118 of the housing. These leads then extend downwardly along the outer surface of the boom and are held in place by suitable fastening means 134 spaced along the boom.

Figure 6:
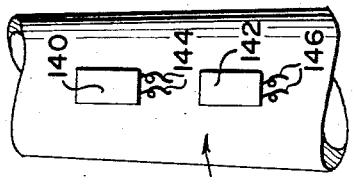
FIG. 6 is a view taken along line 6—6 of FIG. 4 with certain parts removed for the sake of clarity to illustrate the position of strain gauges at one side of the boom.

As seen particularly in FIG. 6, it will be noted that strain gauges 124 and 126 have the longitudinal axes thereof aligned with one another, and it will be understood that the long dimension of the measuring elements of the strain gauges are aligned in a direction parallel with the longitudinal axes of the strain gauges which in this case are disposed substantially parallel with the longitudinal axis of the boom.

Figure 6A:
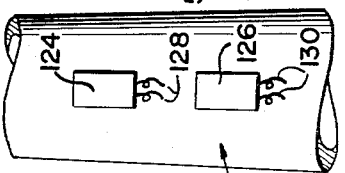
FIG. 6A is a view similar to FIG. 6 taken along line 6A—6A of FIG. 4.

As seen particularly in FIG. 6A, the bending stress measuring means includes a second pair of strain gauges 140 and 142 having leads 144 and 146 connected therewith. These leads extend downwardly through a sealing grommet 150 provided in a suitable opening in the bottom wall 118 of the housing, and the leads then extend downwardly along the outer surface of the boom and are held in place by suitable spaced attaching elements 152.

Strain gauges 140 and 142 also have the longitudinal axes thereof substantially aligned with one another and extending in a direction which is substantially parallel with the longitudinal axis of the boom. The second pair of strain gauges 140 and 142 are disposed at substantially diametrically opposite portions of the boom as are the first pair of strain gauges 124 and 126. In addition, each of the strain gauges 124, 126, 140 and 142 is so disposed that the longitudinal axis thereof lies in the plane of bending of the boom. This plane of bending is a plane which extends substantially perpendicular to the heel pin which pivotally supports the boom, or in other words, perpendicular to the axis about which the boom is pivotally mounted, such plane of bending also passing through the longitudinal axis of the boom. By so disposing the strain gauges 124, 126, 140 and 142 in this manner, they are effectively mounted for measuring the bending stresses developed in the boom.

Figure 7A:
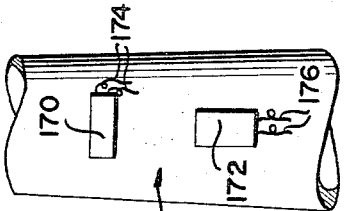
FIG. 7A is a view taken substantially along line 7A—7A of FIG. 5 looking in the direction of the arrows with parts removed to illustrate the strain gauge arrangement.
Figure 7:
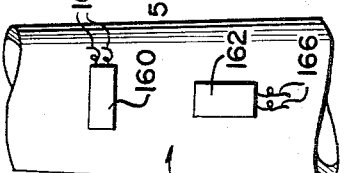
FIG. 7 is a view taken along line 7—7 of FIG. 5 looking in the direction of the arrows with certain parts removed for the sake of clarity.
Figure 5:
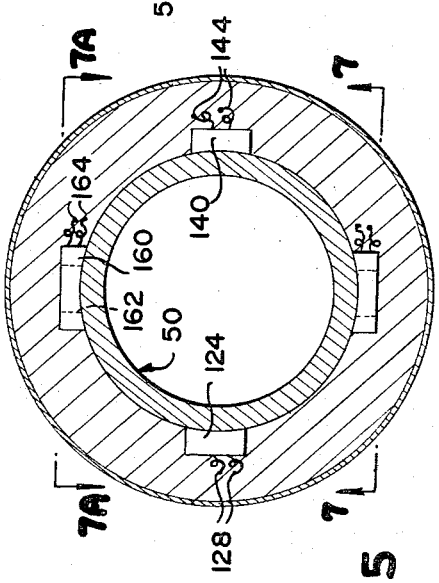
FIG. 5 is a sectional view taken substantially along line 5—5 of FIG. 4 looking in the direction of the arrows.

Referring now to FIGS. 5 and 7, the compression measuring means includes a first pair of strain gauges 160 and 162 having leads 164 and 166 operatively connected therewith. It will be understood that these leads also pass downwardly and outwardly through the lower wall of the housing as the leads aforementioned. As seen particularly in FIG. 7, it will be noted that the longitudinal axis of strain gauge 162 extends substantially parallel with the longitudinal axis of the boom. On the other hand, the longitudinal axis of strain gauge 160 is disposed substantially at right angles to the longitudinal axis of strain gauge 162, or in other words the longitudinal axis of strain gauge 160 extends in a direction parallel with the circumferential dimension of the boom or lies in a plane which extends substantially perpendicular to the axis of the boom.

As seen most clearly in FIG. 7A, the compression stress measuring means includes a second pair of strain gauges 170 and 172 having leads 174 and 176 operatively connected therewith which also extend downwardly and outwardly through the lower wall of the housing in the aforesaid manner. In this pair of strain gauges the longitudinal axis of strain gauge 172 extends substantially parallel with the longitudinal axis of the boom, while the longitudinal axis of strain gauge 170 extends substantially normally to the longitudinal axis of strain gauge 172, or in a generally circumferential direction of the boom.

The third pair of strain gauges 160 and 162 are disposed at substantially diametrically opposite sides of the boom from the fourth pair of strain gauges 170 and 172. It should be noted that the third and fourth pair of strain gauges may be positioned at any desired location on the boom, and as illustrated are shown as being displaced about the outer periphery of the boom substantially 90 degrees from the first and second pairs of strain gauges which measure the bending stresses in the boom. As illustrated, the third and fourth pairs of strain gauges are disposed angularly about the boom approximately 90 degrees from the plane of bending of the boom, although it should be understood that the third and fourth pairs of strain gauges are not necessarily limited to this particular location.

Figure 3:
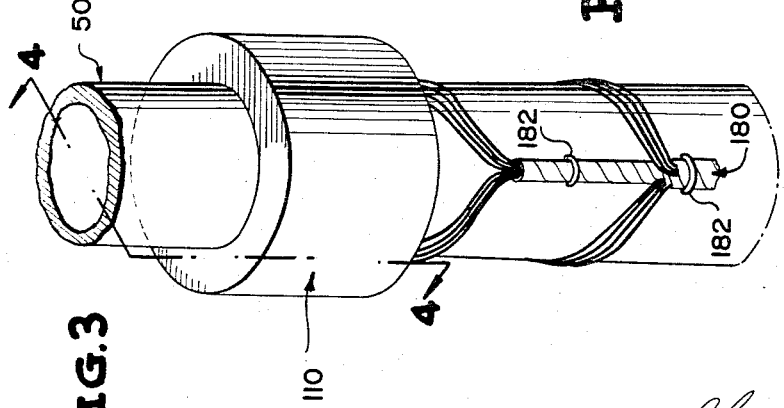
FIG. 3 is an enlarged top perspective view of the portion of the boom upon which the measurement means is mounted.

As seen most clearly in FIG. 3, the various leads from the strain gauges may be mounted within a protective insulating sheath 180 which may be secured to the outer surface of the boom and which may be held in place on the boom by suitable fastening elements 182.

Referring again to FIG. 1, it will be noted that the insulated sheath 180 extends downwardly along the outer surface of the boom and is connected with a container 186 mounted on the winch house. Container 186 may contain the power supply and certain electrical components of the electrical network of the system as hereinafter described. Container 186 is in turn connected through an electrical cable 188 with a control console indicated generally by reference numeral 190. This console may contain the controls for the various winches employed with the heavy lift gear, and suitable warning mechanism may also be incorporated in the console for warning operating personnel of the presence of excessive stresses on the boom.

Referring now to FIG. 2 of the drawings, the electrical network of the stress measuring system of the present invention is illustrated. The first and second pairs of strain gauges 124, 126, and 140, 142 are connected in a bridge circuit arragement. A power supply for energizing this bridge circuit is indicated by reference numeral 200 and connected in the bridge as illustrated. A balancing resistor means 202 and a calibration resistor means 204 are provided for balancing and calibrating the bridge circuit.

The third and fourth pairs of strain gauges 160, 162 and 170, 172 are also connected in a bridge circuit. It will be noted that the strain gauges of the compression stress measuring means are connected in the bridge circuit differently from the strain gauges of the bending stress measuring means. A power supply 210 is provided for the bridge circuit of the third and fourth pairs of strain gauges, and a balancing resistor means 212 and a calibration resistor means 214 is provided for balancing and calibrating this last-mentioned bridge circuit.

The output of the upper bridge circuit as seen in FIG. 2 is connected through an output lead 218 with a first amplifier means indicated by reference numeral 220 and including windings 222 and 224 which are connected as shown. Winding 222 is in turn connected through a lead 30 having a resistor 232 connected therein with an output lead 34. Winding 224 is connected through a lead 236 and thence a resistor 238 and a lead 240 with ground. Lead 236 is also connected through a resistor 242 and a lead 244 with the output lead 234.

Output lead 234 is in turn connected through a lead 250 and a resistor 252 with one side of an indicating means 254 which is illustrated as being a meter relay. The other side of indicating means 254 is connected through a lead 256 with ground. The meter relay may also be connected through a lead 258 with a suitable alarm 260 which is actuated by the meter relay. The alarm may either be an audible or visible type or both, and may for example comprise a warning buzzer, a flash light and the like.

The output lead 234 of amplifier 220 is also connected through a resistor 270 and a lead 272 with one side of second indicating means 274 which may also comprise a meter relay. The other side of indicating means 274 may be connected through a lead 276 with ground through a diode connected transistor means hereinafter described. Indicating means 274 may also be connected through a lead 278 with a suitable alarm means 280 similar to that previously described. It should be understood that the alarm means 260 or 280 would ordinarily be mounted in the console 190 previously described.

The output of the lower bridge circuit as seen in FIG. 2 is connected through a lead 290 with the input of second amplifier means 292 including windings 294 and 296. Winding 294 is connected through resistor 298 and lead 300 with an output lead 302. Winding 296 is connected through a lead 304 and resistor 306 and lead 308 to ground. Lead 304 is also connected through resistor 310 and lead 312 with the output leads 302.

A diode connector transistor network includes three transistors 314, 316 and 318. Each of these transistors is provided with an emitter, a collector and a base as indicated. Lead 302 is connected with the emitter of transistor 314, while the collector thereof is connected through resistor 320 and lead 322 with one side of indicating means 274. The emitter of transistor 316 is connected with lead 276 connected with the other side of indicating means 274, and the collector of transistor 316 is connected through resistor 326 with lead 302 previously described. The emitter of transistor 318 is connected with said other side of the indicating means 274, and the collector thereof is connected with ground.

The electrical network as illustrated in FIG. 2 is so connected that the indicating means 254 will provide a reading of only the compression forces which are ordinarily at a maximum when the boom is in vertical position between the king posts. The indicating means 274 will provide a reading of the maximum surface stress caused both by compressive loads and bending loads. These indicating means will ordinarily be set so that when the reading reaches approximately 80% of the load at which the boom will fail, a suitable warning will be provided by actuation of the alarms 260 or 280. It should be understood that where the compressive stress set point and the combined stress set point are the same, indicating means 254 may be eliminated. On the other hand, where these two set points, or the points at which the alarm is to be actuated, are different, the two indicating means will be employed.

In a typical example, the set points for the bending measurement as well as the compression measurement may be 25,000 p.s.i., and the following discussion will indicate the manner in which the amplifier gain as well as the amplifier network resistance values may be found.

The open circuit signal voltage ($V_{oc}$) available from a strain gauge bridge is given by $$V_{oc} = V_B \cdot \frac{N}{4} \cdot g \cdot \frac{S}{Y}$$

where $V_B$ = supply voltage
$N$ = number of effective active arms
$g$ = gauge factor
$S$ = stress
$Y$ = Young's modulus For the bending measurement, $N=4$, S(set point) = 25,000 p.s.i., $Y=30\times10^6$ p.s.i., $g=1.7$, $V_B=7$ volts, giving $V_{oc}=0.010$ volt. For the compression measurement, $N=2.6$, S(set point) = 25,000 p.s.i., $Y=30\times10^6$ p.s.i., $g=1.7$, $V_B=7$ volts, giving $V_{oc}=.0065$ volt. For the amplifier arrangement of FIGURE 2, the required amplifier gain G can be found by $$G = V_{out}/V_{oc}$$

where $V_{out}$ is the desired output voltage. For $V_{out}$ of 2.47 volts, G (bending) = 247 and G (compression) = 374.

The required amplifier network resistance values are then found using the equations $$G \text{ (compression)} = \frac{R_{242}+R_{238}}{\frac{(R_{242}R_{238}+R_{242}R_s+R_{238}R_s)}{T_e}} + R_{238}$$

$$G \text{ (bending)} = \frac{R_{310}+R_{306}}{\frac{(R_{310}R_{306}+R_{310}R_s+R_{306}R_s)}{T_e}} + R_{306}$$

where
$R_s$ = source resistance = winding plus bridge resistance
$T_e$ = effective transresistance of the magnetic amplifier Typical values for the various resistors employed in the electrical network appear in the following table:

*Resistor values*

| Reference numeral: | Ohms |
|---|---|
| 232 | 6250 |
| 238 | 5.5 |
| 242 | 5000 |
| 298 | 6250 |
| 306 | 12.4 |
| 310 | 5000 |
| 326 | 200 |

In operation, the two bridge circuits including the various parts of strain gauges are first balanced and calibrated, and suitable means may be provided so as to cause the power supply to the circuits to be energized whenever the heavy lift gear is in operation. As mentioned previously, indicating means 254 may be required to provide a separate measurement of the compressive stresses, or indicating means 274 may be employed by itself where the set point for the compressive stresses and the total surface stress are the same. A unique feature of the electrical network as shown in FIG. 2 of the drawings is the fact that the output from amplifier 292 is always positively summed with the output signal from amplifier 220 in the indicating means 274.

The output signal from amplifier 220 is inherently always positive, and the meter 274 movement resistance is considerably less than the summing resistance between the amplifiers and the meter. If the output signal from amplifier 292 is positive, transistor 314 is forward biased, transistor 318 is also forward biased, and transistor 316 is reverse biased. Current flow is then through transistor 314, positively through the meter, and through transistor 318 to ground. Total meter current is given by $$I_m = \frac{1}{R_A + 2R_m} \times (V_{outC} + V_{outB})$$

where $R_m$ is the meter movement resistance and
$R_A$ is the resistance of the summing resistors 252, 270 and 320, each of which has a value of approximately 6600 ohms.

If the output signal from amplifier 292 is negative, transistor 314 is reverse biased, transistor 318 is reverse biased, and transistor 316 is forward biased. Current flow is then out of the amplifier means 220, through resistor 270, positively through meter relay 274, through transistor 360 and a resistance equal to $R_m$ and back to ground through amplifier means 292. The meter current for this case will be $$I_m = \frac{1}{R_A + 2R_m} \times (V_{outC} - V_{outB})$$

It is accordingly evident that this novel diode connected transistor network is such that meter relay 274 will always provide a reading of the maximum surface stress.

It is apparent from the foregoing that there is provided according to the present invention a new and novel boom stress measurement and warning system for use with heavy lift cargo booms which continuously monitors both the stresses caused by compressive loads and bending loads on the boom or any combination thereof. The system provides a suitable warning in the form of an alarm to prevent over-stressing and failure of the boom. The novel electrical measuring network ensures that maximum surface stress is measured at all times as well as providing a separate indication of the compressive stresses if so desired. The apparatus is furthermore quite simple and inexpensive in construction, yet efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A boom stress measurement system comprising an elongated boom which is pivotally supported at the lower end portion thereof and which is provided with cargo support means at the upper portion thereof, and stress measuring means mounted adjacent the point of maximum stress on said boom, said stress measuring means including first measuring means for measuring bending stresses on said boom, and second measuring means for measuring compression stresses on said boom.

2. Apparatus as defined in claim 1 wherein said measuring means includes an electrical network comprising strain gauges mounted on said boom (amplifier means connected with said strain gauges, and indicating means connected with said amplifier means.

3. A boom stress measurement system comprising an elongated boom of generally circular cross sectional configuration, said boom being pivotally supported at the lower end portion thereof to define a plane of bending extending substantially perpendicular to the pivotal axis about which said boom is pivotally supported, said boom including cargo support means at the upper portion thereof, stress measuring means mounted on said boom at an intermediate portion thereof and adjacent the point of maximum stress on the boom, said stress measuring means including first measuring means for measuring bending stresses on said boom, and second measuring means for measuring compression stresses on said boom, said second means being spaced from said first measuring means.

4. Apparatus as denfied in claim 3 wherein said first measuring means includes first strain gauge means and second strain gauge means, said first and second strain gauge means being mounted on substantially diametrically opposite sides of the boom and in said plane of bending, said second measuring means comprising third strain gauge means and fourth strain gauge means, said third and fourth strain gauge means being disposed at substantially diametrically opposite sides of said boom.

5. Apparatus as defined in claim 4 wherein said first and second strain gauge means are connected in an electrical bridge arrangement, and said third and fourth strain gauge means are connected in an electrical bridge arrangement, first amplifier means connected with the output of aid second-mentioned bridge arrangement, second amplifier means connected with said first-mentioned bridge arrangement, and indicating means connected with the outputs of said amplifiers for indicating the stresses on said boom.

6. Apparatus as defined in claim 5 wherein said indicating means includes at least one meter relay means, and alarm means connected with the output of said meter relay means.

7. A boom stress measurement system comprising an elongated load support boom of generally circular cross-sectional configuration, said boom being pivotally supported at the lower end portion thereof about a pivot axis so as to define a plane of bending extending substantially perpendicular to said pivot axis and extending through the longitudinal axis of said elongated boom, said boom including cargo support means at the upper portion thereof, stress measuring means mounted on the outer portion of said boom adjacent the point of maximum stress on the boom, said stress measuring means including first measuring means for measuring bending stresses on said boom, said first measuring means including first and second pairs of strain gauges, said first and second pairs of strain gauges being disposed on substantially diametrically opposed sides of the boom, each of the strain gauges of said first pair and said second pair of strain gauges being substantially aligned with one another in a direction parallel with the longitudinal axis of the boom, second measuring means also including first and second pairs of strain gauges disposed on substantially diametrically opposite sides of said boom, the strain gauges of each pair of strain gauges of the second measuring means being disposed at substantially right angles to one another so that one of such strain gauges extends in a direction substantially parallel with the longitudinal axis of said boom and the other of said strain gauges extends in a circumferential direction with respect to said boom.

8. Apparatus as defined in claim 7 wherein a protective housing is provided which extends circumferentially about the boom, all of said strain gauges being disposed within said protective housing so as to be protected from the elements.

9. Apparatus as defined in claim 7 wherein the strain gauges of said first measuring means are connected in a first bridge circuit, said strain gauges of said second measuring means being connected in a second bridge circuit, power supply means connected with each of said bridge circuits, first amplifier means connected with said second bridge circuit, second amplifier means connected with said first bridge circuit, and indicating means connected with the output of each of said amplifiers.

10. Apparatus as defined in claim 9 wherein the output of said second amplifier means is connected directly with said indicating means, the output of said first amplifier means being connected with said indicating means through a diode network, said diode network including three diodes, a first diode being connected between the output of said first amplifier means and one side of said indicating means, a second diode being connected between the output of said first amplifier means and the other side of said indicating means, and a third diode being connected between said other side of said indicating means and ground.

11. Apparatus as defined in claim 10 wherein each of said diodes comprises a diode connected transistor, each of said transistors including an emitter, a collector and a base, the emitter of said first diode being connected with the output of said first amplifier means, the collector of said first diode being connected with one side of said indicating means, the emitter of said second diode being connected with the other side of said indicating means, the collector of said second diode being connected with the output of said first amplifier means, the emitter of said third diode being connected with the said other side of said indicating means, the collector of said third diode being connected with ground.

12. An electrical network for causing an output to be always positively summed with another output in an indicating means comprising first output means, second output means, indicating means connected with each of said output means, said first output means being connected directly with one side of said indicating means, said second output being connected with said one side of said indicating means through a diode connected transistor including an emitter, a collector and a base, said emitter being connected with said second output and said collector being connected with said one side of said indicating means, said second output being connected with the opposite side of said indicating means through a second diode connected transistor including an emitter, a collector and a base, the emitter of said second transistor being connected with said other side of said indicating means and the collector of said second transistor being connected with said second output, said other side of said indicating means being connected with grounds through a thrid diode connected transistor having an emitter, a collector and a base, said last-mentioned emitter being connected with said other side of said indicating means, and said last-mentioned collector being connected with ground.

13. A boom stress measurement system comprising an elongated load supporting boom of generally circular cross-sectional configuration, said boom being pivotally supported at the lower end portion thereof about a pivotal axis and defining a plane of bending extending substantially perpendicular to said pivotal axis and passing through the longitudinal axis of said boom, said boom having cargo support means at the upper portion thereof, stress measuring means mounted adjacent the point of maximum stress on said boom, said stress measuring means including first measuring means for measuring bending stresses on said boom and comprising first and second pairs of strain gauges mounted at substantially opposite sides of said boom, each of the strain gauges in each of said first and second pairs of strain gauges being substantially aligned with one another in a direction extending parallel with the longitudinal axis of said elongated boom, said stress measuring means including second measuring means for measuring compression stresses on said boom and including third and fourth pairs of strain gauges disposed at substantially opposite sides of said boom, the strain gauges of each of said third and fourth pairs of strain gauges being disposed at substantially right angles to one another, all of said strain gauges being disposed within a protective housing extending circumferentially about said boom, means for retaining said strain gauges in place within said housing, said first and second pairs of strain gauges being disposed in a first bridge circuit, said third and fourth strain gauges being connected in a second bridge circuit, power supply means operatively connected with each of said bridge circuits, first amplifier means connected with said second bridge circuit, second amplifier means connected with said first bridge circuit, first indicating means connected with the output of each of said first and second amplifiers, and including an electrical network for causing the output of said first amplifier means to be always positively summed with the output from said second amplifier means in the indicating means.

14. Apparatus as defined in claim 13 including second indicating means connected only with the output of said second amplifier means.

References Cited

UNITED STATES PATENTS

| | | | |
|---|---|---|---|
| 2,849,048 | 8/1958 | Curtner | 73—88.5 X |
| 3,019,643 | 2/1962 | Curry | 73—88.5 X |
| 3,199,685 | 8/1965 | Bopp | 73—100 X |
| 3,255,627 | 6/1966 | Doig et al. | 73—88.5 X |

JAMES J. GILL, *Acting Primary Examiner.*

RICHARD C. QUEISSER, *Examiner.*

C. IRVIN McCLELLAND, *Assistant Examiner.*